(12) United States Patent
Moslehi et al.

(10) Patent No.: US 8,165,469 B1
(45) Date of Patent: Apr. 24, 2012

(54) CASCADE AND RING MEASUREMENT SENSOR WITH FIXED AND VARIANT WAVELENGTH ENCODING

(75) Inventors: Behzad Moslehi, Los Altos, CA (US); Richard J. Black, Menlo Park, CA (US); Vahid Sotoudeh, Los Altos, CA (US)

(73) Assignee: Intelligent Fiber Optic Systems, Inc., Santa Clara, CA (US)

( * ) Notice: Subject to any disclaimer, the term of this patent is extended or adjusted under 35 U.S.C. 154(b) by 678 days.

(21) Appl. No.: 12/356,526

(22) Filed: Jan. 20, 2009

(51) Int. Cl.
*H04J 14/00* (2006.01)
*H04J 14/02* (2006.01)

(52) U.S. Cl. ............................... 398/83; 398/43; 398/84

(58) Field of Classification Search .................... 398/43, 398/83, 84
See application file for complete search history.

*Primary Examiner* — Armando Rodriguez
(74) *Attorney, Agent, or Firm* — File-EE-Patents.com; Jay A. Chesavage

(57) ABSTRACT

An optical add drop multiplexer (OADM) for use in a sensing system has the OADMs arranged either in a cascade or in a ring, with each OADM accepting a source input and generating a source output, and accepting a signal input and generating a signal output, where the source input includes a broadband optical source for use in providing optical power to a plurality of sensor gratings arranged in a series string, each sensor grating responsive to a physical parameter at a unique wavelength. The series string of sensors is excited by optical power coupled from the broadband source port, and returns optical signal response to a sensor port of the OADM, which optical energy is added to optical energy at the signal input port to form the signal output port. In another embodiment for a ring topology, the source ports and signal ports include a clockwise and counterclockwise set of source and sensor signals, and the sensor signals for CW and CCW each include a primary and secondary signal.

20 Claims, 8 Drawing Sheets

Cascade direct FBG sensing w/o redundancy

Cascade direct FBG sensing w/o redundancy

FBG direct w/redundancy

Cascade direct FBG sensing w/ redundancy

Cascade direct FBG sensing w/ redundancy
& Electrical Interface

CASCADE AND RING MEASUREMENT SENSOR WITH FIXED AND VARIANT WAVELENGTH ENCODING

This invention was made with Government support under N68335-08-C-0067 awarded by the Department of the Navy. The Government has certain rights in this invention.

FIELD OF THE INVENTION

The present invention relates to a distributed measurement system. In particular, the invention relates to distributed fiber Bragg sensors used with digital measurements in a wavelength-based system configured in a cascade or ring topology with primary and backup communications channels.

BACKGROUND OF THE INVENTION

Measurement of physical phenomenon may be accomplished by converting the phenomenon to be measured to a physical change to a fiber Bragg grating. A Bragg grating is a series of modulations of internal refractive index which are written on the inner core of an optical fiber. These gratings may then be coupled to a structure to be characterized to generate a measurement of strain or temperature. Any physical phenomenon which may be converted to a grating length or index change may be used to accomplish the measurement of the underlying phenomenon. In a typical use, the Bragg grating is illuminated by a broadband source such that multiple Bragg gratings may be interrogated, and each of these gratings illuminated by the broadband source such that each grating reflects a particular wavelength which may be measured to determine the strain or temperature applied to each grating. When the relationship between wavelength and parameter is characterized or understood, the individual reflected wavelengths may be ready by a wavelength interrogator, and the change in wavelength can be converted to a physical value. A prior art tunable grating may be seen in U.S. Pat. No. 7,133,582 by Moslehi et al, and prior art cascade wavelength interrogators are known from U.S. Pat. No. 7,127,132, 6,895,132, 6,788,835, 6,751,367, and 6,597,822 by Moslehi et al, which disclosures are hereby incorporated by reference.

OBJECTS OF THE INVENTION

A first object of the invention is a cascade Optical Add Drop Multiplexer (OADM) sensor system having a final OADM preceded by a plurality of zero or more upstream OADMs preceded by a first OADM, each OADM having a source input, signal input, source output, and signal output, the source input of each OADM coupling optical power to the source output, each OADM adding measurement signal energy from a sensor port to measurement energy received on the signal input to form the signal output of each OADM, where a broadband optical source is coupled to the source input of the first OADM and an optical interrogator is coupled to the signal output of the final OADM.

A second object of the invention is a sensor Optical Add Drop Multiplexer (OADM) having a source input port, a signal input port, a source output port, and a signal output port, the source input port coupled to a splitter which provides some received optical energy to a circulator input port, and the remainder to the source output port, the circulator also having an output port and a sensor port, the circulator output port coupled to a combiner for adding the circulator output port to the signal input port to form the signal output port, the circulator sensor port coupled to a plurality of gratings responsive to unique wavelengths, the circulator coupling optical energy from the input port to the sensor port, the circulator also coupling energy from the sensor port to the output port.

A third object of the invention is a digital OADM having a source input port, a signal input port, a source output port, and a signal output port, the source input port coupled directly to the source output port, the signal input port coupled to a first circulator input port, the first circulator also having an output port and a grating port, the first circulator grating port coupled to a first end of a grating responsive to a particular wavelength, the grating having a second end which is coupled to the grating port of a second circulator, the second circulator also having an input port and an output port, the second circulator output port coupled to the OADM signal output port, the first circulator output port coupled to an optical to electrical converter for generating a serial stream of receive data, and the second circulator coupled to an electrical to optical converter having an optical interface at the same particular wavelength of the grating, the electrical to optical converter electrical interface coupled to a serial stream of data which may be either USB (Universal Synchronous Bus) data or Ethernet data.

A fourth object of the invention is a redundant fiber optic sensor ring having a plurality of OADMs, each OADM having as inputs: a clockwise primary input signal, a clockwise secondary input signal, a clockwise input source, a counterclockwise primary input signal, a counterclockwise secondary input signal, a counterclockwise input source, each OADM having as outputs: a clockwise primary output signal, a clockwise secondary output signal, a clockwise output source, a counterclockwise primary output signal, a counterclockwise secondary output signal, a counterclockwise output source, the plurality of OADMs arranged in a ring with each clockwise primary input signal, secondary signal input, and source input coupled to an adjacent OADM clockwise primary signal output, secondary signal output, and source output, respectively, each counterclockwise primary input signal, secondary signal input, and source input coupled to an adjacent OADM counterclockwise primary signal output, secondary signal output, and source output, respectively, each OADM selecting an active clockwise signal and an active counterclockwise signal from the clockwise or counterclockwise primary and secondary signals, respectively, each OADM adding optical energy at a unique wavelength, where for a sensor OADM, the optical energy added is associated with a local measurement which is either a fiber Bragg grating wavelength reflection at a unique wavelength, the Bragg grating reflection from the application of broadband optical energy from either the clockwise source or counterclockwise source, or for a digital OADM, the added optical energy is associated with a digital measurement which is provided at a unique wavelength as a serial stream of amplitude or phase modulated digital data, the digital OADM optionally also receiving a particular wavelength as an amplitude or phase modulated signal and converting this modulated signal to a stream of digital data.

SUMMARY OF THE INVENTION

In a first embodiment of a sensor Optical Add Drop Multiplexer (OADM), a series connected cascade of sensor OADMs has local fiber Bragg grating (FBG) sensors connected to each local sensor OADM. The local FBG sensor for each local sensor OADM has a sensor string formed from an optical fiber having one or more sequential FBGs, each responsive to a unique wavelength, the local sensor having a single port and thereby forming a one-port string sensor. A sensor OADM is coupled to other sensor OADMs in a cascade configuration such each sensor OADM has a broadband optical source input port, a broadband optical source output port containing optical power derived from the broadband source input port such as by using a splitter, a signal input port containing optical sensor responses from upstream OADMs, and a signal output port containing optical responses from the series of sensors attached to the instant OADM as well as from upstream OADMs coupled to a signal output port. The sensors of a particular OADM are energized by coupling optical energy from the splitter coupled to the broadband input source port, with the remainder of the splitter power directed to the sensor OADM source output port. The optical energy from the splitter is provided to a circulator having an input port as well as a sensor port and an output port, the circulator output port coupled to a combiner which sums measurement signals from the OADM sensor with measurement signals from the OADM signal input port to generate the OADM signal output port signal. The sensors attached to each sensor OADM have a plurality of fiber Bragg gratings (FBGs) which are disposed sequentially on a single fiber and coupled to the circulator sensor port. In this embodiment, optical energy from the broadband source is coupled by the splitter to the circulator, where the optical energy is transferred through the circulator sensor port to the sensor, reflected at unique wavelengths by the individual sensor gratings back to the circulator sensor port, where it is directed to the circulator output port which is coupled to a combiner and added with previous sensor responses from the OADM signal input port, thereby forming the OADM signal output port. A plurality of such OADMs, each having a source and signal input and output, may be cascade connected, the first OADM having a broadband optical source applied to the source input, and each subsequent OADM having its source input coupled to a previous OADM source output, each OADM having a signal input coupled to a signal output of a previous OADM, with each OADM responsive to a range of wavelengths, which range is further divided into a series of sensor wavelengths, each sensor wavelength operative using a particular Bragg grating of the series string of gratings, each of those individual gratings of the string sensor coupled to a particular parameter to be measured in a physical system.

In another embodiment of the invention for use with digital sensors, a digital OADM is provided which is fully compatible for use with the sensor OADM previously described. The digital OADM has an OADM broadband source input port directly coupled to an OADM broadband source output port (for compatibility with the sensor OADM), and an OADM signal input port coupled to an OADM broadband first circulator having an input port, an output port, and a grating port, the first circulator grating port coupled to one end of a fiber Bragg grating responsive to a particular wavelength, and a second circulator having an input port, an output port, and a grating port, the grating port coupled to the other end of the fiber Bragg grating, the output port coupled to the digital OADM signal output port. Optical energy at wavelengths other than the particular wavelength travels through the first circulator, grating, second circulator, and to the signal output. Optical energy at the particular wavelength is coupled to an optical electrical (OE) converter, deserialized, presented to a serial controller for framing, and then presented as one or more digital outputs. A series of digital sensors provide digital inputs which are formatted, presented to a serial controller, serialized, converted by an electrical to optical (EO) converter at the particular wavelength of the grating, and provided to the second circulator input port for coupling to the digital OADM output port, which adds to the local sensor responses to the upstream sensor signal responses provided to the digital OADM input port.

In a redundant ring embodiment, each sensor redundant OADM is arranged in a ring having sequential interconnections between OADMs from a first OADM to a final OADM which is circularly coupled back to the first OADM. One set of the interconnections carry optical signals in a clockwise (CW) direction, and another set of interconnections carry signals in an opposite counterclockwise (CCW) direction. The CW and CCW set of optical signals each include a primary signal and a secondary signal, which each OADM accepts as an input and also generates as an output, and a clockwise (CW) and counterclockwise (CCW) broadband source signal, which each OADM accepts and generates, where one or more broadband optical signal generators are present around the ring to provide multiple sources and directions for signals, and one or more optical interrogators are positioned to read the sensor responses.

In one embodiment of the redundant ring, each sensor redundant OADM has a signal degradation detector for each CW and CCW primary and secondary signals, the signal degradation detector selecting a particular primary or secondary OADM input signal as the active signal, adds the instant OADM sensor signals to the active signal, and couples the combined signal to the corresponding primary or secondary signal OADM output port. The sensor string of the particular OADM consists of a plurality of fiber Bragg gratings operating in a particular range of wavelengths, each sensor in its own unique wavelength range within the particular range of wavelengths, the sensor string having a single port and operative with reflective FBGs. By selection between the primary and secondary fibers and additional selection between the CW and CCW sets of these signals, an improved reliability sensor system may be provided.

In another embodiment of the redundant ring for use with sensors generating digital signals, the sensor string of the sensor redundant OADM is replaced by a single wavelength optical transmitter which generates an optical output at a particular wavelength. In this embodiment, a digital measurement input is received by a controller which frames, serializes, converts to the single wavelength optical signal, and outputs it to the digital OADM for addition to the other signals on the ring.

DETAILED DESCRIPTION OF THE INVENTION

Figure 1:
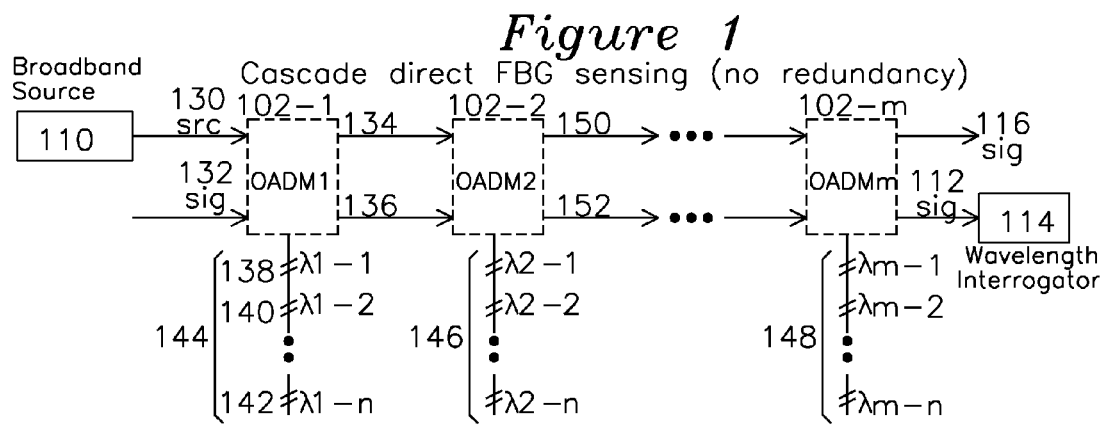
FIG. 1 shows a block diagram for a sensor OADMs or digital OADMs connected in cascade.

FIG. 1 shows a block diagram for a series of cascaded OADMs coupled to fiber Bragg grating sensors. Each block OADM1 102-1 OADM2 102-2 through OADM-m 102-m performs an optical "add drop" function, or alternatively an optical "add" function, whereby each OADM has a broadband source input port, a signal input port, a broadband source output port, and a signal output port. For the example first OADM1 102-1 shown in FIG. 1, the OADM1 has associated single port sensor 144 which operates in a first wavelength band, each sensor 138, 140, 142 uniquely operating at a particular wavelength within that wavelength band, with each sensor typically measuring a combination of physical parameters such as temperature, strain, or any measurement which may be made by an FBG. A broadband source 110 is coupled to input port 130 and contains broadband signal energy for use in stimulating the optical sensors 144, and also accepts a signal input port 132 which contains signals at wavelengths other than the first wavelength band of OADM 1 102-1, such as the responses from previous OADMs in the cascade chain. The first OADM 132 of a cascade OADM system may not have a signal input 132 excited with previous OADM energy, but is shown for clarity and consistency with other OADMs 102-2 and 102-m. The example OADM1 also generates a broadband source output 134, and a signal output 136 which contains the responses from the signal input 132 plus the responses from sensors 144, which are typically in a separate wavelength band from the upstream sensors. In this manner, each of the OADMs 102-1, 102-2, through 102-m accept broadband optical energy on a port such as 130, responses from upstream OADMs such as on port 132, and generate a broadband source output such as port 134, and generate a signal output 136 which contains the signal input 132 responses of upstream OADMs plus the sensor responses from sensor string 144. The final OADM 102-m generates a signal output 112 which contains the response of first OADM 102-1 and upstream OADMs 102-2, as well as the final OADM 102-m sensor 148 responses, which are present in signal output 112 and coupled to interrogator 114 for resolution of wavelength responses into associated physical measurements. Final OADM 102-m source output 116 is shown so final OADM 102-m is identical to the other OADMs for completeness and clarity, although final source output 116 typically does not contain optical power, as this would represent unused optical power that could have been presented to upstream stages.

Figure 2:
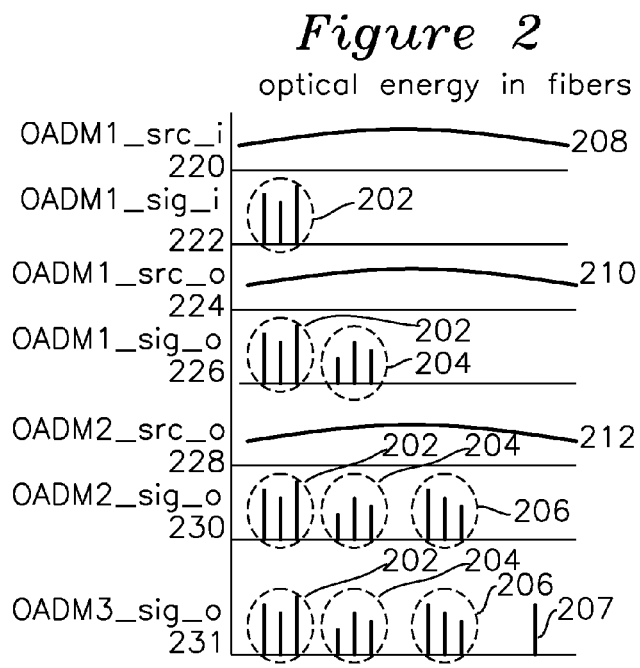
FIG. 2 shows an amplitude versus wavelength plot for the optical energy in the fibers of FIG. 1.

FIG. 2 plot 220 shows the broadband optical energy 208 which is provided such as source input port 130 of FIG. 1 and signal energy 202 such as from OADMs which precede OADM1 which may appear on signal input port 132 of FIG. 1 as the optical responses 202 shown in plot 222. OADM1 broadband source output 210 (such as 134 of FIG. 1) contains the energy present in 208 less losses such as the energy lost in sensors 144, and the signal output 136 is shown in plot 226, which shows optical sensor response energy 204 from sensor string 144 and the responses from upstream sensors 202 which were present on signal input fiber 132. Similarly, the second OADM 202-2 of FIG. 1 accepts the broadband input signal 212 from the broadband signal output 134 of the upstream OADM1, and OADM2 generates a broadband output 150 shown as plot 228 and a signal output 152 shown as plot 230, which contains responses 202 and 204 from upstream OADM devices which precede the current OADM, and response 206 from sensor string 146. The sensor grating reflections represented in the optical energy at wavelength groups 202, 204, 206 are associated with a particular sensor OADM, the energy from each grating at a particular wavelength within a unique wavelength range, where the measurement from a physical grating can be resolved by measurement of the wavelength reflected. In another type of sensor known as a digital OADM, the optical energy is amplitude or phase modulated at a single fixed wavelength, represented as wavelength 207 of plot 231 showing the output of an example digital OADM3 which adds amplitude or phase modulated single wavelength energy 207 to the physically encoded reflection wavelengths 202, 204, 206 from example sensor OADMs. In this manner, each sensor OADM of the cascade receives broadband optical energy and signal response energy from previous sensors, and each sensor OADM directs some of the input broadband optical source energy to a locally attached sensor string which provides one or more wavelength responses which are added to the previously received wavelength responses to generate a signal output containing all such responses. A digital OADM transmits digital data on a unique single wavelength which is carried through the system along with optical energy from one or more sensor OADMs.

Figure 3:
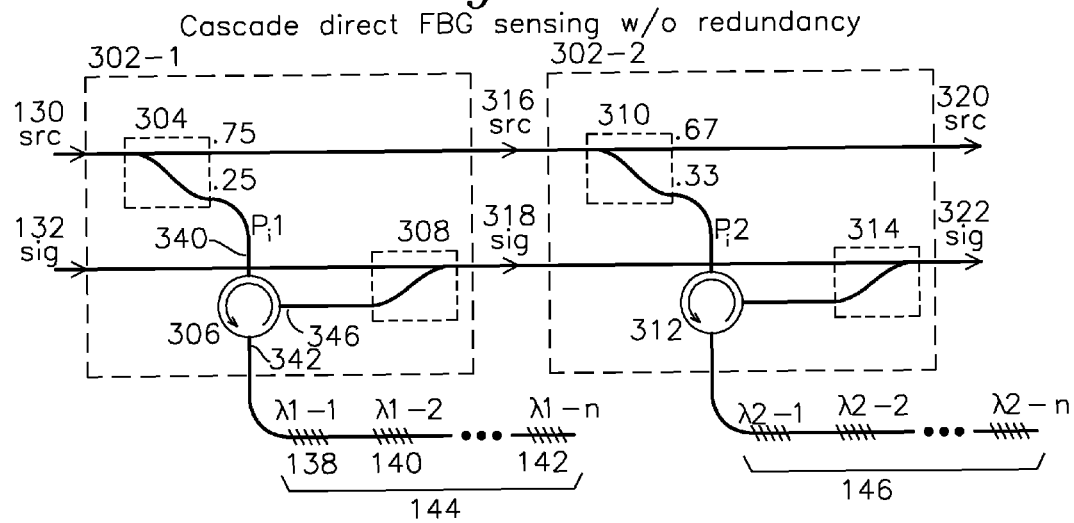
FIG. 3 shows a block diagram for sensor OADMs connected in cascade for use in FIG. 1.

FIG. 3 shows an example embodiment for two sensor OADMs of FIG. 1. A first OADM 302-1 and a second OADM 302-2 contain identical internal optical components. Broadband source input 130 is directed to a splitter 304 which provides a fraction of optical energy, shown as Pi1 of 0.25 the input signal, to a circulator 306 having an input port 340, output port 346, and sensor port 342. Energy from the splitter 304 is directed to circulator 306 input port 340, which directs this energy to the sensor string 144. Each of the gratings 138, 140, 142 of sensor string 144 operate in a unique region of a range of wavelengths within the wavelengths allocated to sensor string 144, and reflected energy from each sensor is directed to the sensor port 342 of circulator 306, after which it is directed to circulator output port 346, and the input port of combiner 308, where it is added to previous responses at signal input port 132, and directed to signal output port 318, which is applied to the signal input port of second OADM 302-2. The 75% balance of power from splitter 304 is directed to broadband source output port 316. Second sensor OADM 302-2 operates similarly using sensor string 146, and as with each sensor OADM, each wavelength within an FBG sensor is distinct from operating wavelengths of other FBG sensors, and each OADM operates over a range of wavelengths which is unique from other wavelengths. In one embodiment, where several cascaded OADMs are used, the splitters 304, 310 of each OADM each removes an equal amount of power for use by each sensor. For the case where there are n sensor strings, each sensor string having an identical number of sensors and an identical reflection efficiency compared to other sensors, the power to be applied to each sensor string is P/n. For the example case of 4 OADMs with identical sensor strings operating in unique wavelengths and a broadband input level of 0.1W reference, and ignoring other losses, each circulator 306, 312, etc would receive 0.025W of optical energy. The first splitter would remove 0.025W from 0.1W applied (0.25/0.75 split as shown for 304 of FIG. 3), the second splitter would remove 0.025W from 0.075W applied (0.33/0.67 split as shown for 310), the third splitter would remove 0.025W from 0.05W applied, and the fourth OADM would receive 0.025W and use all of this energy.

Figure 4:
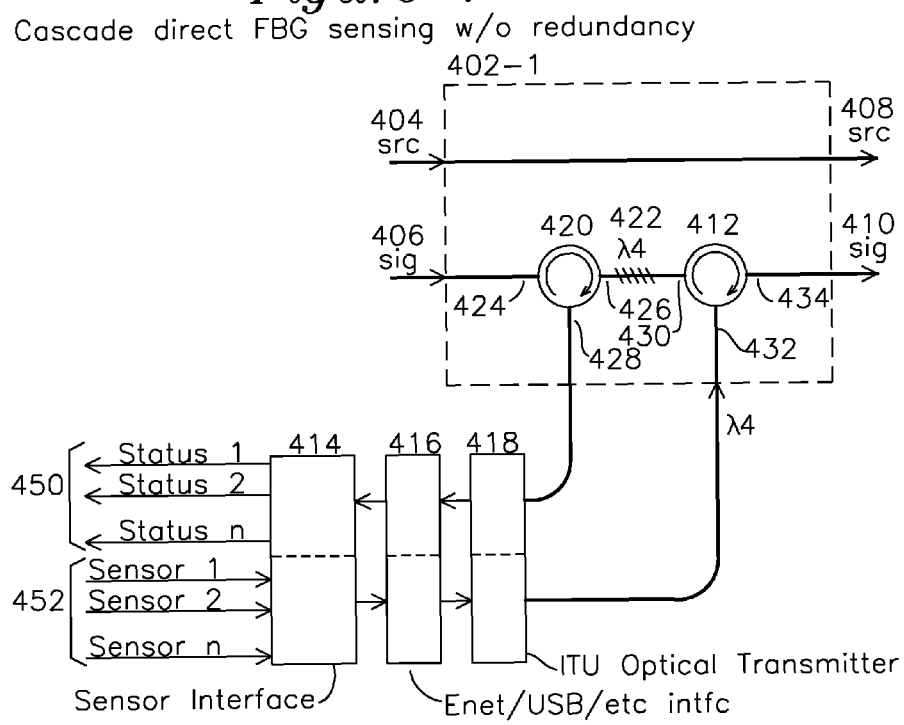
FIG. 4 shows the block diagram for a digital OADM coupled to a digital sensor, for use in FIG. 1.

FIG. 4 shows an example of a digital OADM for use with a digital sensor, providing a measurement as a binary word or other digital format. This digital format may be converted to any serial or frame-based protocol such as Ethernet using any of the IEEE local area network (LAN) standards, including in particular the IEEE 802 series of standards, more particularly including the 802.3 for Media Access Control (MAC). Another common serial format is Universal Synchronous Bus (USB), as described by the USB implementers forum www.usb.org. Either of these or other protocols may use a point to point or point to multi-point protocol, with each OADM response added to other sensor responses using a single amplitude or phase modulated wavelength which is unique from other wavelengths in use. As a convention in the diagrams which follow, optical paths are shown as thick lines and electrical or control paths are shown as thin lines. For an example Ethernet embodiment, a digital OADM 402-1 has a broadband source input port 404 which is directly coupled to the broadband source output 408 for compatibility with the OADMs of FIG. 3 and FIG. 1. The signal input port 406 is coupled to a first circulator 420 having an input port 424, an output port 428, and a grating port 426. Input port 424 energy is directed to grating port 426, and thereafter to grating 422, which reflects only optical energy at a λ4 wavelength, which energy is returned to circulator 420 grating at port 426, and directed to output port 428 and to Optical to Electrical (OE) converter 418, which passes the electrical serial signal to Ethernet interface 416, which may include on the receive side a deserializer, MAC frame interface, and generate data or a data stream to sensor interface 414, which may provide outputs such as status or control bits 450. Sensors which provide output data in a digital form 452 are coupled to sensor interface 414, which provides this information to a frame interface 416 such as Ethernet, USB, etc, and this output is provided at a particular wavelength such as an ITU wavelength which is identical to grating 422 λ4 wavelength. The transmitter optical energy at this wavelength λ4 is applied to circulator 412 input port 432, which directs energy to grating 422 which reflects this λ4 energy back to the circulator grating port 430, which couples it to circulator output port 434 and to signal output port 410. Using the OADM 402-1 of FIG. 4, it is possible to combine the present digital OADM of FIG. 4 with the sensor OADMs of FIG. 3. This architecture thereby provides great flexibility in interfacing sensors of any type to the system.

In a typical use scenario for the sensor OADM of FIG. 3 and the digital OADM of FIG. 4, the OADMs are arranged in a cascade, with each subsequent OADM accepting a source input from a preceding source output, and each OADM accepting a signal input from a preceding OADM signal input. The first OADM in the cascade has a source input coupled to a broadband optical source, and since no signal input is applied to the first OADM, the signal input may be eliminated. For FIG. 3, one embodiment for a first OADM would be to couple circulator output 346 directly to signal output 318, and for FIG. 4, one embodiment for a first OADM would be to eliminate circulator 420, grating 422, the receive chain of 418, 416, 414, 450 (since the first OADM has no ability to receive information from an upstream OADM), so the transmitter output 432 is directly coupled to signal output 410. Similarly, the last OADM of the cascade has no source output, and the signal output would be connected to a wavelength interrogator of the prior art. Alternatively, for an expandable configuration, where OADMs could be added or removed up to a fixed number of OADMs, the splitters of each could be configured to provide a fixed power split, and the source input, source output, signal input, and signal output of each OADM provided for ease of addition and removal, such that each OADM may be used in any position in the chain, since each operates in a unique wavelength.

Figure 5:
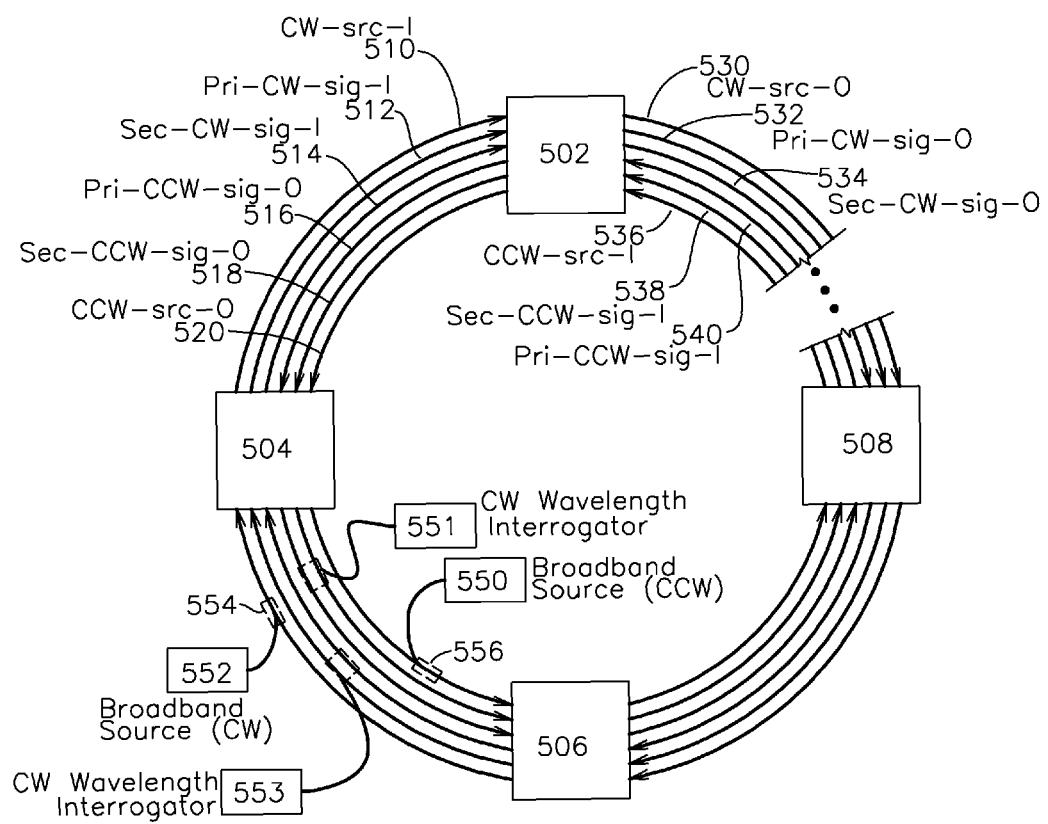
FIG. 5 shows a block diagram for a redundant sensor ring using redundant sensor OADMs or redundant digital OADMs.

FIG. 5 shows a redundant sensor ring, which includes a plurality of switching OADMs 502, 504, 506, 508, which sensor ring is expandable to any number of redundant OADMs. The signals for a particular redundant OADM 502 are labeled with respect to that OADM, and include clockwise (CW) propagating signals, counterclockwise (CCW) propagating signals, source (SRC) signals, sensor signals (SIG), inputs (I) and outputs (O), and primary (PRI) and secondary (SEC) signals, which function is used to form the signal names. The optical source signals are generated by one or more distributed broadband optical sources, shown as 552 using coupler 554 for the CW source fiber, and source 550 and coupler 556 for the counterclockwise direction. The sources and couplers for each direction may be located within each OADM, but is shown separately in FIG. 5 for clarity. In the example configuration, each OADM shown in detail for OADM 502 accepts a clockwise (CW) broadband source input CW-SRC-I 510, a CW primary signal input PRI-CW-SIG-I 512, a CW secondary signal input SEC-CW-SIG-I 514, a CCW primary signal input PRI-CCW-SIG-I 540, a CCW secondary signal input PRI-CCW-SIG-I 538, and a CCW source CCW_SRC_I 536. The output signals generated by OADM 502 are the primary clockwise signal PRI_CW_SIG_O 532, secondary clockwise signal SEC_CW_SIG_O 534, clockwise source CW_SRC_O 530, primary counterclockwise signal PRI_CCW_SIG_O 516, secondary CCW signal SEC_CCW_SIG_O 518, and CCW source output CCW_SRC_O 520. In this redundant configuration, the CW and CCW optical sources may be selected for use as an OADM optical source, and the sensor input/output signals use the primary or secondary clockwise or counterclockwise signal fibers, depending on the nature of the fault condition, if any. Signals placed on primary or secondary CW signal ring are coupled out of the ring and converted into physical measurements by CW wavelength interrogator 553 and signals placed on the primary or secondary CCW ring are coupled out of the ring and converted into physical measurements by CCW wavelength interrogator 551.

Figure 6:
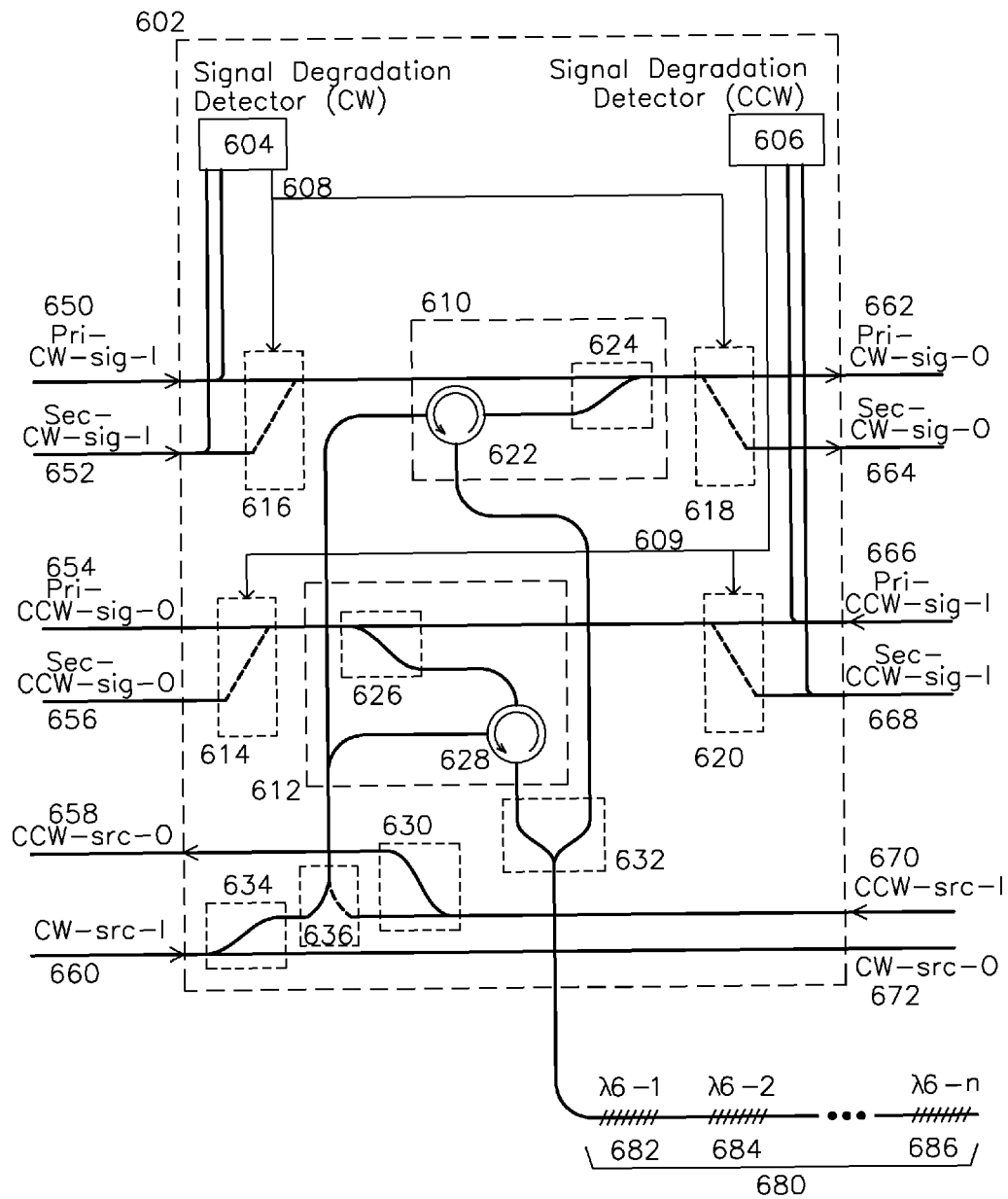
FIG. 6 shows a block diagram for a redundant sensor OADM for use in a redundant sensor ring, where the sensors are tunable fiber Bragg gratings.

FIG. 6 shows an example embodiment of a redundant sensor OADM 602 for use with an FBG sensor string 680, which may be understood in combination with the ring of FIG. 5. Thick lines represent optical paths, and thin lines represent electrical control elements. Each OADM receives a clockwise primary signal 650 and clockwise secondary signal 652, which contains the sensor responses of upstream redundant OADMs. Similarly, a counterclockwise primary input signal 666 and counterclockwise secondary input signal 668 are provided which contain sensor responses from the upstream sensors in the opposite direction. The clockwise primary output signal 662 and clockwise secondary output signal 664 are generated such as by using a selector 618 which selects a primary or secondary output, or alternatively using a splitter 618. Counterclockwise primary output signal 654 and counterclockwise secondary output signal 656 are similarly generated by 614 which may act as a single output switch or as a splitter which evenly divides the signal to be sent. In one embodiment of the invention, a signal degradation detector 604 for CW input signals and a CCW signal degradation detector 606 for counterclockwise signals are operative by examining an optical level on a primary or secondary signal to determine which signal is in use. If the primary CW input signal 650 is in use, the detector 604 asserts CW select signal 608 which instructs CW input signal selector 616 to select the primary path at input selector 616 and optionally at output selector 618, if 618 is a switch rather than a splitter which maintains signals at both primary and secondary outputs. Similarly, CCW signal degradation detector 606 examines primary and secondary input signals 666 and 668, respectively, and CCW select signal 609 is used to control switch 620 and optionally output switch 614, which may alternatively be a splitter. CW input source 660 and CCW input source 670 generate CW output 672 and CCW output 658, respectively, and one of the source inputs is selected 636. Considering the case where the CW source input 660 is selected, a fraction of the signal is split 634, selected 636, and applied to CW OADM 610, where circulator 622 directs broadband optical energy through combiner/splitter 632 to sensors 680, which return reflected FBG energy at a unique sensor wavelength for each sensor 682, 684, 686, and these are split 632, provided to circulator 622, combiner 624, and output to primary CW signal output 662 or secondary CW signal output 664. Similarly, CCW OADM 612 receives broadband source optical energy to circulator 628, which broadband energy is directed through splitter/combiner 632 to sensor string 680, returned to circulator 628, combined 626 and directed to the primary CCW signal output 654 or secondary CCW output 656, as required. Alternatively, 632 may operate as a switch, selecting between CW OADM 610 or CCW OADM 612, where only one OADM is CW or CCW path is active at a particular time.

Figure 7:
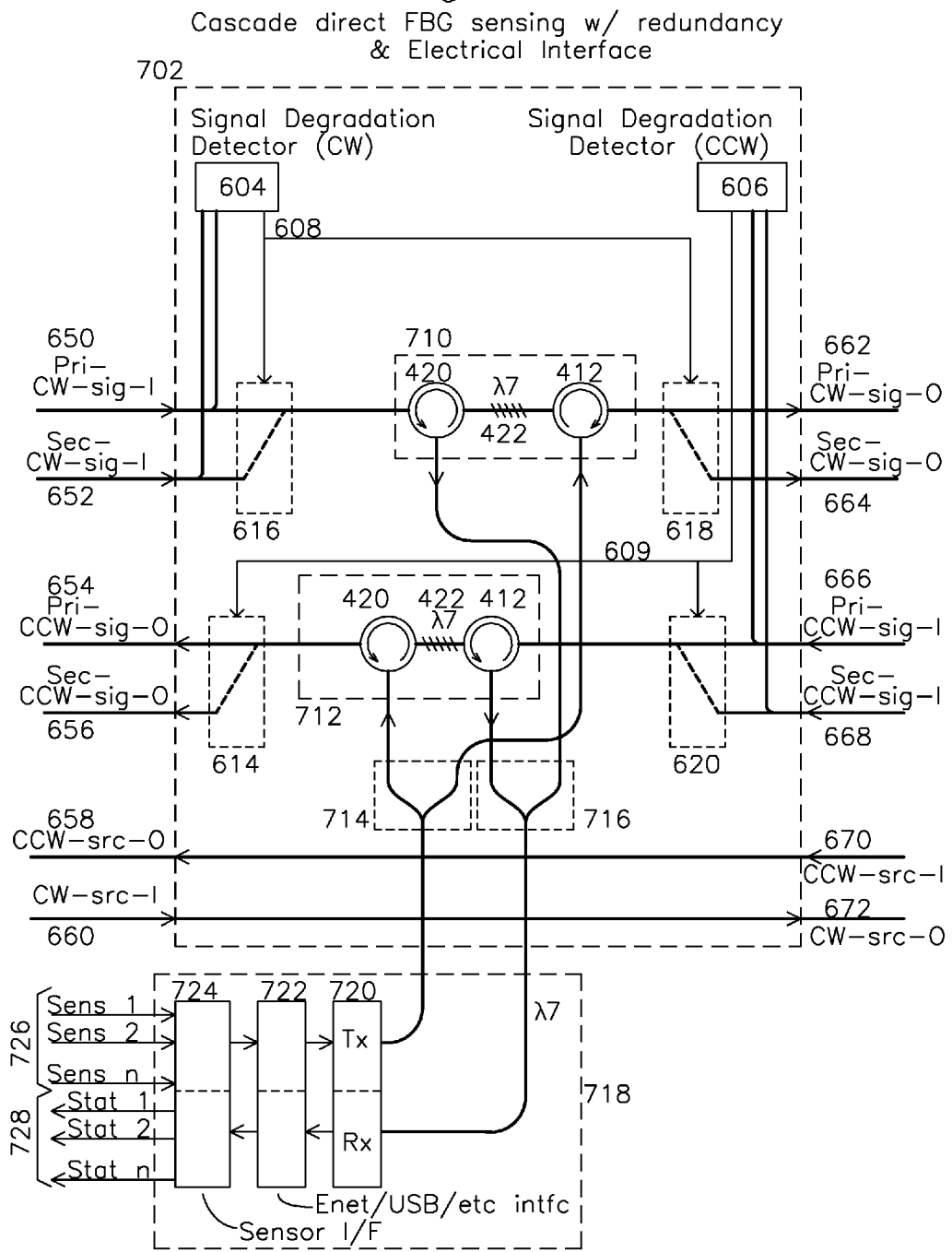
FIG. 7 shows a block diagram for a redundant digital OADM for use in a redundant sensor ring, digital sensor signals are framed and serially transmitted as an amplitude modulated single wavelength.

FIG. 7 shows the redundant digital OADM 702 for use with digital sensor interface 718. The selection of an active path from CW primary 650 and CW secondary 652 using signal detector 604 which generates CW select 608 applied to switches 616 and 618 is as described for FIG. 6. The selection of CCW active path from CCW primary 666 and CCW secondary 668 using CCW signal detector 606 in combination with control signal 609 applied to CCW input switch 620 and CCW output switch 614 is also as described for FIG. 6. Digital sensor signals are applied to sensor interface 724 which frames the signals such as by concatenation, which packet is applied to serial framer 722, which may be Ethernet, USB, or any point to point or point to multipoint protocol, which generates a serial stream which is coupled to an electrical to optical (EO) converter 720, which provides narrowband modulation at wavelength λ7, or optionally may be a wideband optical generator coupled to an FBG which only passes λ7. This amplitude modulated serial optical signal is split 714 and passed to first OADM 710 and also second OADM 712, each of which operate as described for the signal path 406 to 410 of FIG. 4. Optical energy at wavelength λ7 on either the CW active signal selected by switch 616 or CCW active signal selected by switch 620 are directed from first OADM 710 and second OADM 712 to combiner 716, where the λ7 wavelength amplitude modulated signal is applied to receive optical to electrical (OE) Rx interface 720, which serial electrical signal is framed by the receive section of framer 722, which provides the digital signal to sensor interface 724. Many variations of the processing of FIG. 7 are possible, however one example embodiment is shown for clarity in understanding the invention. For example, the ring may contain pairs of digital redundant interfaces 702 and 718 which operate in tandem, or the transmitter section and receiver section may be in physically separate locations. In one embodiment, the digital OADMs may operate as point-to-point pairs, such that two digital OADMs on the ring operate at the same particular fixed wavelength, resulting in one digital OADM transmitting at that particular wavelength over optical fiber which carries many other sensor measurements, the fixed wavelength digital information being received by another digital OADM which operates at the same wavelength. In this configuration, the two stations may transmit Ethernet packets such as the Transmission Control Protocol (TCP) of the Internet Protocol (IP) over a point-to-point link. In another example configuration, each digital OADM may have a transmitter part physically located near a sensor providing digital information, and a corresponding receiver part which is physically located near a point of measurement aggregation.

Figure 8:
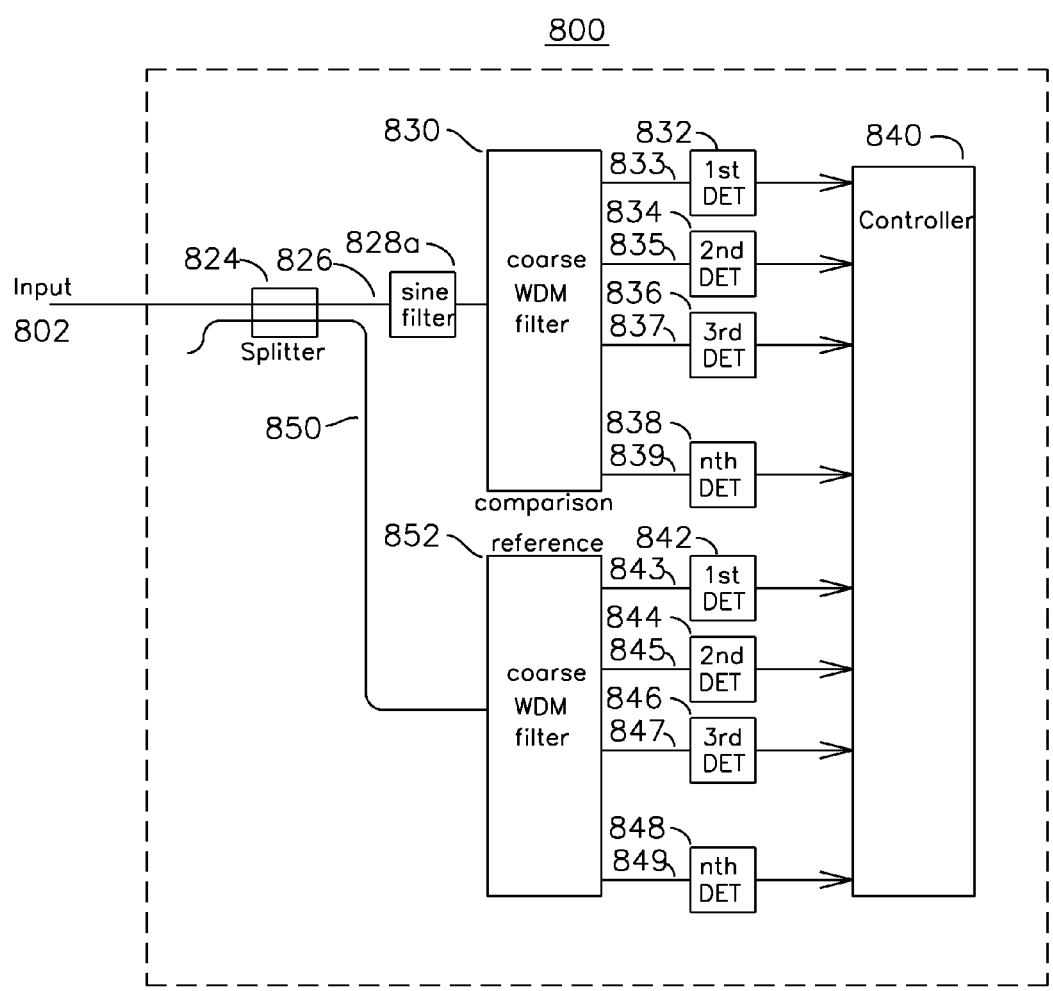
FIG. 8 shows a block diagram for a wavelength interrogator.

FIG. 8 shows one example of a wavelength interrogator 800. Optical energy to be interrogated for wavelength, such as the FIG. 1 signal 112 from final OADM 102-m applied to interrogator 114, or the interrogators 551 or 553 of FIG. 5, is applied to input 802. The incoming energy is applied to splitter 824, which splits into a first path through sine filter 828a to course WDM filter 830, and to a second path directly to coarse WDM filter 852 which has identical characteristics as filter 830. Each filter output 833, 835, 837, 837 of the first filter and 843, 845, 847, 849 is coupled to a corresponding detector 832, 834, 836, 838 for the first WDM filter 830 and 842, 844, 846, 848 for the second WDM filter 852. The number of detectors is equal to the number of wavelengths to be interrogated, and in one embodiment, the detectors are read in pairs for a particular wavelength, such that for a wavelength responsive to 833 and 843 filter outputs, the detectors 832 and 842 are differentially read and compared. In this manner, the combined effect of the sine filter 828 and matched first WDM filter 830 and second WDM filter 852 provide discrimination as to which wavelength is present, which determination is made by controller 840 which is capable of reading multiple detectors and simultaneously resolving multiple wavelengths present at input 802.

Figure 9A:
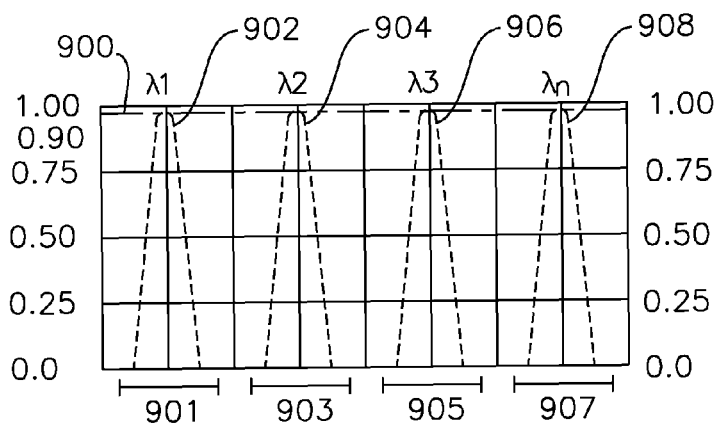
FIGS. 9A, 9B, 9C, 9D, and 9E show optical responses presented to the detectors of the wavelength interrogator.
Figure 9B:
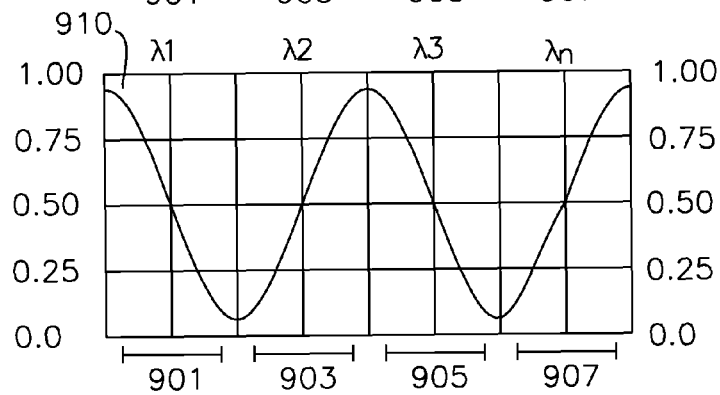
Figure 9C:
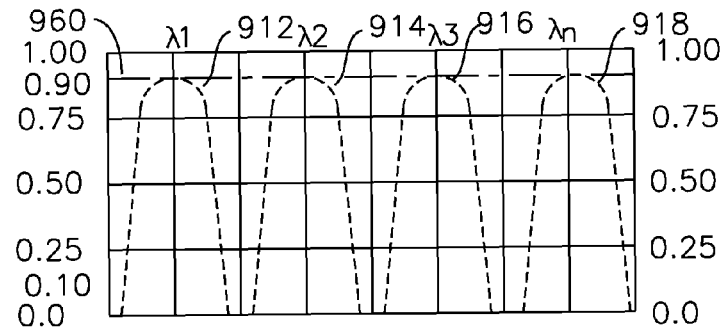
Figure 9D:
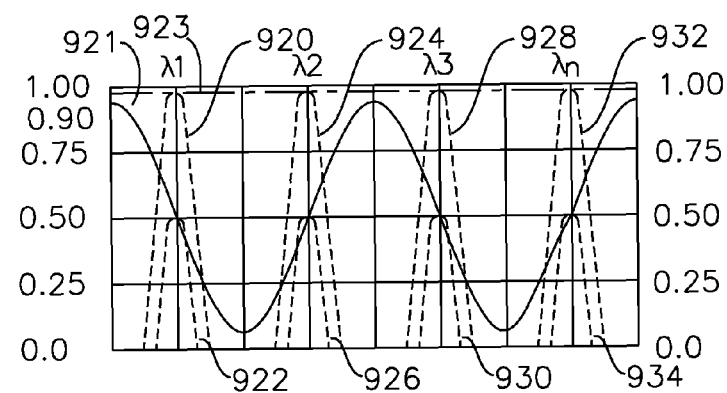
Figure 9E:
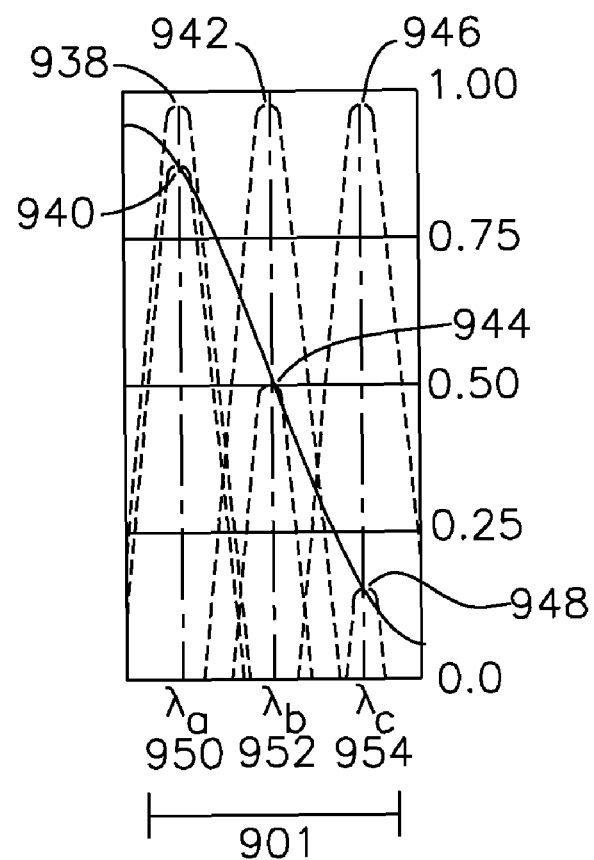

FIGS. 9A, 9B, 9C, 9D, and 9E show the operation under one embodiment of the interrogator 800 of FIG. 8. FIG. 9A shows an amplitude versus wavelength plot for the broadband source 900 with grating responses from sensors 902, 904, 906, 908, with each sensor providing a response at a particular wavelength. FIG. 9B shows the response of the sine filter 910, and FIG. 9C shows the response 912, 914, 916, 918 for WDM filters 830 and 852. When combined, the resulting amplitude responses are shown in FIG. 9D, with 920 representing the combined effect as seen at detector 842 of the second WDM filter 852 for the WDM filter 852 response 912 which results in grating response 920 at detector 842. In comparison, the combined effect of the sine filter 828a, first WDM filter 830 and grating response generates response 922. FIG. 9E shows the continuum of example detector 842 responses 938, 942, 946 for the first detector at a variety of wavelengths lambda a, lambda b, lambda c, and also the corresponding example detector 832 responses 940, 944, 948 for the same wavelengths. In this example embodiment, with knowledge of the sine filter characteristics and matched WDM filter responses which occur within the particular response wavelengths of the sensor gratings, it is possible to simultaneously interrogate many wavelengths and resolve each wavelength, which wavelength may subsequently be converted into a stress or temperature measurement. FIG. 8 shows one example wavelength interrogator for clarity in understanding the invention, but is not intended to limit the practice of the invention. Additionally, the optical sources used in the ring may include any known optical source including LEDs, optical lasers, or any source which provides optical energy over the operating range of wavelengths for the Bragg grating sensors. The broadband source may also include multiple sources operating over continuous or discontinuous wavelength ranges including 850 nm, 1200 to 1600 nm, or any other suitable optical wavelength range. Accordingly, the optical fiber may be single mode, multi-mode, or any optical fiber suitable for transmission of optical energy.

We claim:

1. An optical signal processor for use in a cascade sensor, the optical signal processor having:
   a source input port containing broadband optical energy;
   a signal input port optionally containing previous response wavelengths;
   a source output port;
   a signal output port;
   a splitter having an input and coupled to said source input port, a first output coupled to said source output port, and a second output coupled to a circular input port, said circular also having a sensor port and an output port coupled to a combiner which forms an output coupled to said signal output port from said circulator output port and said signal input port;
   where said circular sensor port is coupled to a sensor string having one or more fiber Bragg grating (FBG) sensors, each said fiber Bragg grating sensor operative in a unique wavelength;
   whereby broadband optical energy which enters said source input port has a fraction of said optical energy directed through said splitter to said circular, which directs said broadband optical energy to said sensor string, return energy from said sensor string being directed back to said circulator and thereafter to said combiner where said sensor optical energy combines with optical energy in said signal input port to form optical energy in said signal output port.

2. The signal processor of claim 1 where optical energy directed to said circulator input port is directed to said sensor port, and optical energy provided to said sensor port is directed to said circulator output port.

3. The signal processor of claim 1 where said string sensor includes at least one FBG sensor measuring strain.

4. The signal processor of claim 1 where said string sensor has at least one FBG sensor measuring temperature.

5. The signal processor of claim 1 where said optical signal processor has said signal input port and said source input port coupled to the signal output port and source output port, respectively, of an upstream OADM, and said source output port and signal output port are coupled to the source input port and signal input port, respectively, of a downstream OADM.

6. A cascade measurement system having:
   a plurality of Optical Add Drop Multiplexers (OADM), each said OADM having a source input port, a signal input port, a source output port, and a signal output port, each said OADM also having a sensor port for receiving or transmitting measurement information;
   said OADMs arranged in a series cascade with a first OADM, a final OADM, and one or more upstream OADMs following said first OADM and also proceding said final OADM, each one of said upstream OADMs and said final OADM having said source input port and said signal input port coupled to an upstream said OADM source output port and signal output port, respectively;
   a broadband optical source coupled to said first OADM source input port;
   a wavelength interrogator coupled to said final OADM signal output port.

7. The measurement system of claim 6 where at least one of said OADMs is a sensor OADM having;
   said OADM source input port is coupled to a splitter having a first output connected is said OADM source output port and a second output coupled to a circulator input port, said circulator also having a sensor port and an output port, said circulator sensor port coupled to said OADM sensor port;
   a combiner summing said circulator output port and said CADM signal input port, said sum coupled to said OADM signal output port;
   a plurality of gratings disposed on a single fiber and coupled to said OADM sensor port, each said grating responsive to a particular wavelength different from other sensor grating wavelengths;
   where said broadband optical source provides optical energy to said at least one OADM source input port which is coupled through said splitter to said circulator input port to said circulator sensor port and to said sensor gratings, said sensor gratings reflecting optical energy back to said circulator sensor port, said circulator directing said optical energy to said OADM signal output port, said optical energy coupled through other said OADMs to said final OADM and to said wavelength interrogator.

8. The measurement system of claim 7 where at least one said grating measures a strain or a temperature.

9. The measurement system of claim 8 where said grating returns a wavelength identified by said wavelength interrogator.

10. The measurement system of claim 6 where at least one of said OADMs is a digital interface OADM having;
    said OADM source input port is coupled to said OADM source output port;
    said OADM signal input port is coupled to a first circulator input port, said first circulator also having an output port and a grating port;
    said OADM signal output port is coupled to a second circulator output port, said second circulator also having an input port and a grating port;
    an optical grating disposed on a fiber and responsive to a particular wavelength, said grating having an input and an output, said grating input coupled to said first circulator grating port, said grating output coupled to said second circulator grating port;
    said first circulator output port coupled to an optical to electrical converter, thereby generating a stream of serial receive electrical data;
    an electrical to optical converter accepting a stream of serial transmit electrical data and converting it is a modulated optical stream at said optical grating particular wavelength, and coupling said optical stream to said second circulator input port.

11. The measurement system of claim 10 where at least one of said first circulator or said second circulator directs optical energy from said input port to said grating port, and also directs optical energy from said grating port to said output port.

12. The measurement system of claim 10 where at least one of said serial receive electrical data or said serial transmit electrical data is compatible with an Ethernet format.

13. The measurement system of claim 10 where at least one of said serial receive electrical data or said serial transmit electrical data is compatible with Universal Synchronous Bus (USB) and contains data for at least one measurement.

14. The measurement system of claim 10 where said electrical to optical converter generates an optical output at said particular wavelength using a broadband source coupled to a grating at said particular wavelength.

15. The measurement system of claim 10 where said electrical to optical converter generates an optical output at said particular wavelength using a fixed wavelength source at said particular wavelength.

16. An Optical Add Drop Multiplexer (OADM) having:
a broadband source optical input coupled to a broadband optical output;
a signal output port;
a signal optical input port coupled to a first circulator input port, said first circulator having a grating port coupled to the input port of a grating responsive to a particular wavelength, said grating passing wavelengths which are not at said particular wavelength to a grating output port, said first circulator also having a data output port;
a second circulator having an input port coupled to said grating output port, said second circulator having a data input port and also an output port coupled to said OADM signal output port;
said first circulator data output port coupled, in sequence, to an optical to electrical converter, a deserializer, and a signal output generating output signals;
a digital sensor input receiving digital sensor signals, said digital sensor signals coupled, in sequence, to a serial framer; a serializer, an electrical to optical converter operative at a said particular wavelength, said optical converter output at said particular wavelength coupled to said second circulator data input port;
whereby signals at said particular wavelength which are presented to said signal input port are coupled to said first circulator output port, signals from said electrical to optical converter at said particular wavelength are coupled to said signal output port, and signals at all other wavelengths which are presented to said signal input are coupled through said first circulator, through said grating, through said second circulator and to said signal output port.

17. The cascade measurement system of claim 6 where said sensor port of each said OADM is coupled to a series string of fiber Bragg gratings (FBG), each said FBG reflecting optical energy in a unique band of wavelengths from any FBG coupled to any said first OADM, said upstream OADM, or said final OADM.

18. The cascade measurement system of claim 6 where each said OADM couples a substantially uniform optical power to said sensor port of each said first ODM, said upstream OADM, and said final OADM.

19. The cascade measurement system of claim 6 where at least one said OADM couples optical energy from said source input port to said source output port, and at least one said OADM includes a first circulator having an output port, said first circulator receiving optical power from said source input port or said signal input port, said first circulator output coupled to a second circulator input, said second circulator also adding optical energy at a particular wavelength associated with a measurement to said first circulator output port, said second circulator having an output coupled to said signal output port.

20. The measurement system of claim 6 where said sensor port is coupled to at least one fiber Bragg grating.

* * * * *